(12) United States Patent
Muenzer et al.

(10) Patent No.: US 10,272,521 B2
(45) Date of Patent: Apr. 30, 2019

(54) LASER MACHINING APPARATUS COMPRISING A PARALLEL DISPLACEMENT UNIT

(71) Applicant: SCANLAB GmbH, Puchheim (DE)

(72) Inventors: Hans-Joachim Muenzer, Puchheim (DE); Martin Valentin, Puchheim (DE)

(73) Assignee: SCANLAB GmbH, Puchheim (DE)

( * ) Notice: Subject to any disclaimer, the term of this patent is extended or adjusted under 35 U.S.C. 154(b) by 0 days.

(21) Appl. No.: 15/315,657

(22) PCT Filed: Jun. 10, 2015

(86) PCT No.: PCT/EP2015/062888
§ 371 (c)(1),
(2) Date: Dec. 1, 2016

(87) PCT Pub. No.: WO2015/189241
PCT Pub. Date: Dec. 17, 2015

(65) Prior Publication Data
US 2017/0157705 A1    Jun. 8, 2017

(30) Foreign Application Priority Data

Jun. 12, 2014 (DE) .................. 10 2014 108 259

(51) Int. Cl.
*G02B 26/08* (2006.01)
*B23K 26/06* (2014.01)
(Continued)

(52) U.S. Cl.
CPC .......... *B23K 26/043* (2013.01); *B23K 26/042* (2015.10); *B23K 26/046* (2013.01);
(Continued)

(58) Field of Classification Search
CPC .... B23K 26/082; B23K 26/08; B23K 26/064; B23K 26/0643
(Continued)

(56) References Cited

U.S. PATENT DOCUMENTS 4,323,307 A    4/1982  Seeley
4,655,547 A *  4/1987  Heritage ............... B23K 26/06
                                                    359/559
(Continued)

FOREIGN PATENT DOCUMENTS

CN    101772398 A    7/2010
CN    101786200 A    7/2010
(Continued)

OTHER PUBLICATIONS

Eng. Translation of Specification of German Patent Application DE102012111090A1 to Petschik et al. Filed: Nov. 2012.*

(Continued)

*Primary Examiner* — Dana Ross
*Assistant Examiner* — Lawrence H Samuels
(74) *Attorney, Agent, or Firm* — Cahn & Samuels, LLP (57) ABSTRACT

The invention refers to an apparatus for laser material processing having a beam deflecting unit (16) for deflecting the laser beam, a parallel-offsetting unit (14) including at least three reflecting mirrors (26, 28, 30), wherein one reflecting mirror (26) of the at least three reflecting mirrors for the parallel-offset of the laser beam is rotatable, and a focusing device (18) for focusing the laser beam on a workpiece (20) to be processed.

24 Claims, 4 Drawing Sheets

(51) Int. Cl.
*B23K 26/04* (2014.01)
*B23K 26/082* (2014.01)
*B23K 26/042* (2014.01)
*B23K 26/062* (2014.01)
*B23K 26/046* (2014.01)

(52) U.S. Cl.
CPC ........ *B23K 26/062* (2015.10); *B23K 26/0643* (2013.01); *B23K 26/0665* (2013.01); *B23K 26/082* (2015.10)

(58) Field of Classification Search
USPC ......... 219/121.74, 121.8, 121.65, 0.1, 121.6; 359/201
See application file for complete search history.

(56) References Cited

U.S. PATENT DOCUMENTS

| | | | | |
|---|---|---|---|---|
| 4,812,613 | A * | 3/1989 | Gorisch | A61F 9/008 219/121.74 |
| 5,017,755 | A * | 5/1991 | Yahagi | G02F 1/1309 219/121.68 |
| 5,925,271 | A * | 7/1999 | Pollack | B23K 26/02 219/121.74 |
| 7,525,707 | B2 * | 4/2009 | Warner, Jr. | B23K 26/0066 219/121.74 |
| 7,859,752 | B2 * | 12/2010 | Weick | B23K 26/0648 219/121.6 |
| 2004/0074881 | A1 * | 4/2004 | Oishi | B23K 26/0736 219/121.63 |
| 2004/0129685 | A1 | 7/2004 | Arai et al. | |
| 2005/0236381 | A1 * | 10/2005 | Nomaru | B23K 26/0853 219/121.74 |
| 2006/0151449 | A1 * | 7/2006 | Warner, Jr. | B23K 26/0066 219/121.65 |
| 2008/0124816 | A1 * | 5/2008 | Bruland | B23K 26/0613 438/6 |
| 2008/0259425 | A1 * | 10/2008 | Boettcher | B23K 26/0643 359/201.1 |
| 2012/0024832 | A1 * | 2/2012 | Eck | B23K 26/046 219/121.75 |
| 2013/0335798 | A1 | 12/2013 | Cooper | |
| 2016/0114434 | A1 * | 4/2016 | Regaard | B23K 26/046 219/121.85 |
| 2016/0193692 | A1 * | 7/2016 | Regaard | B23K 26/032 219/121.62 |

FOREIGN PATENT DOCUMENTS

| | | |
|---|---|---|
| CN | 102000917 A | 4/2011 |
| CN | 103372721 A | 10/2013 |
| CN | 203221280 U | 10/2013 |
| CN | 103692090 A | 4/2014 |
| DE | 102005047328 B3 | 12/2006 |
| DE | 102010049460 A1 | 3/2012 |
| DE | 10 2011 006 152 A1 | 9/2012 |
| DE | 10 2012 101 643 A1 | 8/2013 |
| DE | 102012111090 A1 | 3/2014 |
| EP | 0 437 676 A1 | 10/1990 |
| EP | 1656234 B1 | 1/2007 |
| GB | 2000321 A | 1/1979 |
| JP | H0246987 A | 2/1990 |
| JP | H03-180294 A | 8/1991 |
| JP | H11-121834 A | 4/1999 |
| JP | H11-156567 A | 6/1999 |
| JP | 2003161907 A | 6/2003 |
| JP | 2014-513811 A | 6/2014 |
| WO | 2006/021442 A1 | 3/2006 |
| WO | 2012/118425 A1 | 9/2012 |
| WO | 2013/074033 A1 | 5/2013 |

OTHER PUBLICATIONS

European Patent Office, International Preliminary Report on Patentability in PCT App. No. PCT/EP2015/06288, Jun. 10, 2016.
European Patent Office, International Search Report in PCT App. No. PCT/EP2015/06288, dated Oct. 28, 2015.
European Patent Office, International Preliminary Report on Patentability in PCT App. No. PCT/EP2015/06288, dated Jun. 10, 2016.
Espacenet, English abstract for DE 10 2005 047 328 B3, printed on Nov. 29, 2016.
Espacenet, English abstract for DE 10 2012 111 090 A1, printed on Nov. 29, 2016.
Espacenet, English abstract for EP1656234 A1, printed on Nov. 29, 2016.
Espacenet, English abstract for JP2003161907 A, printed on Nov. 29, 2016.
EPO and Google, English abstract for DE 10 2010 049 460, printed on Nov. 30, 2016.
Espacenet, English abstract for DE102012101643A1, printed on Jun. 14, 2017.
Espacenet, English abstract for DE102011006152A1, printed on Jun. 14, 2017.
Deutsches Patent- und Markenamt, Search Report in Application No. 10 2014 108 259.1, Apr. 30, 2015.
Anonymous, observations filed in EPO application No. 15731863.5, Oct. 31, 2017, pp. 2-6.
European Patent Office, English abstract of CN101772398A, printed on Aug. 23, 2018.
State Intellectual Property Office of People's Republic of China, Office Action in Application No. CN 201580031454.8, dated May 24, 2018.
European Patent Office, Office Action in EPO Application No. 15731863.5, dated Jan. 26, 2018.
European Patent Office, English abstract of CN102000917A, printed on Aug. 23, 2018.
European Patent Office, English abstract of CN203221280U, printed on Aug. 23, 2018.
European Patent Office, English abstract of CN103372721A, printed on Aug. 23, 2018.
European Patent Office, English abstract of CN103692090A, printed on Aug. 23, 2018.
European Patent Office, English abstract of CN101786200A, printed Jan. 9, 2019.
The State Intellectual Property Office of People's Republic of China, Office Action in Application No. 201580031454.8, dated Dec. 24, 2018.
European Patent Office, English Abstract of JP H03-180294 A, printed on Feb. 4, 2019.
European Patent Office, English Abstract of JP H11-156567 A, printed on Feb. 4, 2019.
European Patent Office, English Abstract of JP H11-121834 A, printed on Feb. 4, 2019.
European Patent Office, English Abstract of JP H0246987 A, printed on Feb. 4, 2019.
European Patent Office, English Abstract associated with JP 2014513811 A, printed on Feb. 4, 2019.
Japan Patent Office, Office Action in Patent Application No. 2017-517400, Dec. 25, 2018.
Japan Patent Office, Search Report for Patent Application No. 2017-517400, Dec. 13, 2018.

* cited by examiner

LASER MACHINING APPARATUS COMPRISING A PARALLEL DISPLACEMENT UNIT

This application is the National Stage of International Application No. PCT/EP2015/062888, filed on Jun. 10, 2015, which claimed the benefit of German Application No. DE 10 2014 108 259.1 filed Jun. 12, 2014, which are hereby both incorporated by reference.

I. FIELD OF THE INVENTION

The invention relates to an apparatus for laser material processing, especially to an apparatus for laser material processing that enables the guiding of a laser focus along any desired path.

II. BACKGROUND OF THE INVENTION

Such apparatuses for laser material processing may be used for various purposes, e.g. in the industrial laser material processing. This includes marking or inscribing, removal or structuring processes such as cutting or drilling, sintering (as a rapid prototyping method), and welding.

In various applications of laser material processing, it is preferable to not only guide the position of the laser focus along any desired path but also to simultaneously control the incidence angle of the laser beam axis on the workpiece. Thereby, for example structures of any desired shape may be incorporated into a workpiece, with edges that have a desired inclination angle to the surface of the workpiece. Ideally, the incidence angle should be adjustable independently of the path guiding. The independent adjustment of both of the above parameters should be realizable with high precision and high speed so as to achieve a correspondingly high processing speed in the laser material processing.

This is of special interest for precisely performing drilling processes, for example micro-drilling ($\varnothing$<500 μm and $\varnothing$<200 μm). Holes of such kind are often created by the laser focus being guided along a circular or spiral path (trepanning or spiral drilling). By adjusting the incidence angle of the laser beam axis, holes with a defined conicity may be created.

Document DE 10 2005 047 328 B3 discloses an apparatus for laser beam drilling, comprising a rotating image rotator, a beam manipulator which, when viewed in the beam direction, is arranged in front of the image rotator and serves to adjust the angle and position of the beam relative to the rotation axis of the image rotator, and a focusing device located on the output side of the image rotator. This apparatus is limited in terms of the speed of flexibly adjusting the incidence angle of the laser beam axis on the workpiece and is also limited to drilling holes having a circular shape.

Document DE 10 2010 049 460 A1 further discloses an apparatus for guiding a light beam, in particular a trepanning optic, with two plane-parallel plates that are rotationally driven independently from each other. This device is also limited with regard to the speed of the flexible adjustment of the angle of incidence of the laser beam axis on the workpiece and is largely limited to the drilling of circular holes.

Document EP 1 656 234 B1 shows a scan head as part of a laser drilling and cutting device having a wobble unit for generating a parallel beam displacement. Depending on the setting of this parallel shift, the beam impacts at different distances from the optical axis onto a focusing device, and consequently exits at a corresponding angle from the focusing device. Thus, by adjusting the parallel displacement, an adjustment of the angle of incidence of the laser beam axis on a workpiece may be effected. By arrangement of two plane-parallel optical plates which are rotatable or tiltable about mutually orthogonal axes, a beam offset is accomplished in two directions. Using a scanning block with two mirrors, the laser beam can be guided on a desired path.

The parallel beam offset in plane-parallel plates is especially proportional to the thickness and to the deflection angle of the plane-parallel plate, as a consequence of which relatively thick and hence sluggish plates have to be used for creating large parallel translations and/or have to be rotated by a large angle. The achievable speed in adjusting the laser beam axis and the corresponding processing speed are limited accordingly.

III. SUMMARY OF THE INVENTION

It would be desirable to be able to perform the parallel beam offset and hence the adjustment of the angle of incidence at a higher speed in order to achieve accordingly high processing speeds in the laser material processing.

This is achieved according to the invention by an apparatus for laser material processing comprising a beam deflecting unit, a parallel-offsetting unit (or, e.g., parallel-translating unit, hereafter referred to as parallel-offsetting unit) with at least three reflecting mirrors, wherein one reflecting mirror of the at least three reflecting mirrors for the parallel offset (or the parallel translation) of the laser beam is rotatable, and a focusing device.

Such an apparatus for laser material processing allows for a large parallel offset (or parallel translation) of the laser beam relative to an optical axis with only slight rotation of the rotatable mirror of the parallel-offsetting unit. This allows for an accordingly flexible and quick adjustment of the angle of incidence of the laser beam axis. As a consequence, higher processing speed and thus shorter processing times in laser material processing may be achieved. Further, the angle of incidence of the laser beam axis may be adjusted separately from the path guiding of the laser beam provided by the beam deflecting unit. This ensures a precise adjustment of the angle of incidence as well as a precise path guiding of the laser beam. Further advantageous configurations of the invention may be obtained.

The beam deflecting unit optionally comprises two reflecting mirrors arranged such that the laser beam can be deflected along two directions that are optionally orthogonal relative to each other. The mirror(s) is/are optionally configured as rotating mirrors or tilting mirrors and further optionally coupled to a high speed actuating means such as a galvanometer drive or a piezo drive. In case of multiple mirrors, the arrangement is optionally set such that the mirrors are arranged orthogonally to each other. This allows for the laser beam (e.g., already focused or to be focused) to be directed in x-direction and in y-direction relative to a workpiece surface, thus allowing for a simultaneous two dimensional deflection of the laser beam. Further, galvanometer drives may achieve high path speeds.

Further optionally, the beam deflecting unit is arranged between the parallel-offsetting unit and the focusing device. For example, the beam deflecting unit may be arranged in the propagation direction of the laser beam immediately after the parallel-offsetting unit and immediately before the focusing device. Immediately after and immediately before may herein mean that there is no further (optical) component is coupled between two components. Alternatively or additionally, the apparatus for laser material processing may comprise one or multiple components that is/are arranged between the beam deflecting unit and the focusing device.

The parallel-offsetting unit comprises at least three mirrors, wherein one reflecting mirror of the at least three reflecting mirrors can be rotated for parallel translation of the laser beam and two mirrors are configured to be stationary. In order to realize a compact configuration of the parallel-offsetting unit, the parallel-offsetting unit is optionally configured such that the laser beam is reflected four times by means of the mirror assembly, wherein the entry and exit reflections (in other words, the first and last reflections) in the parallel-offsetting unit take place at the rotatable reflecting mirror. The rotatable mirror of the parallel-offsetting unit is optionally configured as rotating mirror or tilting mirror and further optionally coupled to a high speed actuating means such as a galvanometer drive. This allows for a fast parallel translation of the laser beam to be achieved.

Optionally, the mirrors of the parallel-offsetting unit are arranged substantially triangular. By changing the distances between the mirrors of the parallel-offsetting unit, the desired parallel offset (or parallel translation) may be adjusted per rotation angle of the rotatable mirror. The larger the distance between the mirrors is selected, the larger the achievable parallel offset of the laser beam becomes per rotation angle of the rotatable mirror.

Optionally, a further parallel-offsetting unit for parallel offset (or parallel translation) of the laser beam is provided, wherein the parallel-offsetting units are optically coupled to one another such that the laser beam passing through the two parallel-offsetting units can be offset in parallel along two parallel-offset directions (or parallel translation directions) which are optionally orthogonal to one another. The further parallel-offsetting unit may optionally be configured in the same way as the above described parallel-offsetting unit and may comprise at least three reflecting mirrors, wherein one reflecting mirror of the at least three reflecting mirrors can be rotated for parallel offset (or parallel translation) of the laser beam and two mirrors are configured to be stationary. By the first parallel-offsetting unit, a parallel offset (or parallel translation) in a first parallel-offset direction (or parallel translation direction) may be produced, and by the second parallel-offsetting unit, a parallel offset in a second parallel-offset direction that is optionally orthogonal to the first parallel-offset direction may be produced. With the help of two parallel-offsetting units, the laser beam may then be offset, in other words may be translated in a controlled manner, in parallel in two spatial directions. The angle of incidence of the laser beam axis may thus be adjusted in two spatial directions and an accordingly flexible laser material processing, e.g., for producing conical bore holes, may be achieved.

Optionally, a beam splitter is provided which is provided before, optionally immediately before, the focusing device in the propagation direction of the laser beam. The beam splitter may be configured to decouple the laser beam and/or electromagnetic radiation (e.g., light) detected via the focusing device from the beam path of the laser. In order to improve detection of the electromagnetic radiation (e.g., light) via the focusing device, a lighting for the workpiece may be provided. The beam splitter is optionally provided for monitoring the beam and/or the process on the workpiece surface.

Optionally, a monitoring device is provided which is optically coupled with the beam splitter and which is configured to detect the decoupled laser beam and/or the decoupled electromagnetic radiation (e.g., light).

The apparatus for laser material processing optionally comprises a controller that is configured to control or regulate the parallel-offsetting unit, the beam deflecting unit and/or the focusing unit. The controller may be configured so as to implement a synchronized control of the beam deflecting unit, the parallel-offsetting unit, the focusing device, and/or a laser source. The components of the apparatus for laser material processing can thus be controlled synchronously.

For adjusting the laser focus diameter on the processing surface of the workpiece, a beam shaping device (e.g., a beam expanding device or a beam reduction device) arranged in the propagation direction of the laser beam before, optionally immediately before, the parallel-offsetting unit is optionally provided for adjusting the laser beam diameter. Preferably, the beam shaping device is configured as a variable beam shaping device having a shaping factor, such as expanding factor or reduction factor that is steplessly adjustable. The beam shaping device may, for example, be realized by means of a telescope.

Optionally, a polarizing device is provided which is arranged in the propagating direction of the laser beam before, optionally immediately before, the parallel-offsetting unit and possibly after, optionally immediately after, the beam shaping device. The polarizing device includes a module that allows for the selection of a desired polarizing type, e.g., linear polarizing or circular polarizing or elliptical polarizing. Optionally, the polarizing device is configured to generate a dynamically adjustable polarization. The polarizing device may comprise a moving means that allows for a dynamic adjustment of the polarization that is adapted to the movement of the beam.

The apparatus for laser material processing may include a device for focus position shift of the laser beam arranged in the propagation direction of the laser beam before, optionally immediately before, the focusing device and optionally immediately before or optionally immediately after the beam deflecting unit. This allows for variation in the focus position, i.e., the positioning of the laser focus along a z-direction. Thus a three-dimensional processing of the workpiece is possible. The device for focus position shift may be configured such that an optical element or an optical module is translatable along the propagation direction of the laser beam relative to a stationary optic to thereby vary the focus position as a function of the translation. The device for focus position shift may be integrated in the focusing device. Alternatively or additionally, the focusing device may be translatable by means of an actuating means.

IV. BRIEF DESCRIPTION OF THE DRAWINGS

The invention is described by means of embodiments with reference to the accompanying drawings below.

In the drawings.

V. DETAILED DESCRIPTION OF THE DRAWINGS

Figure 1:
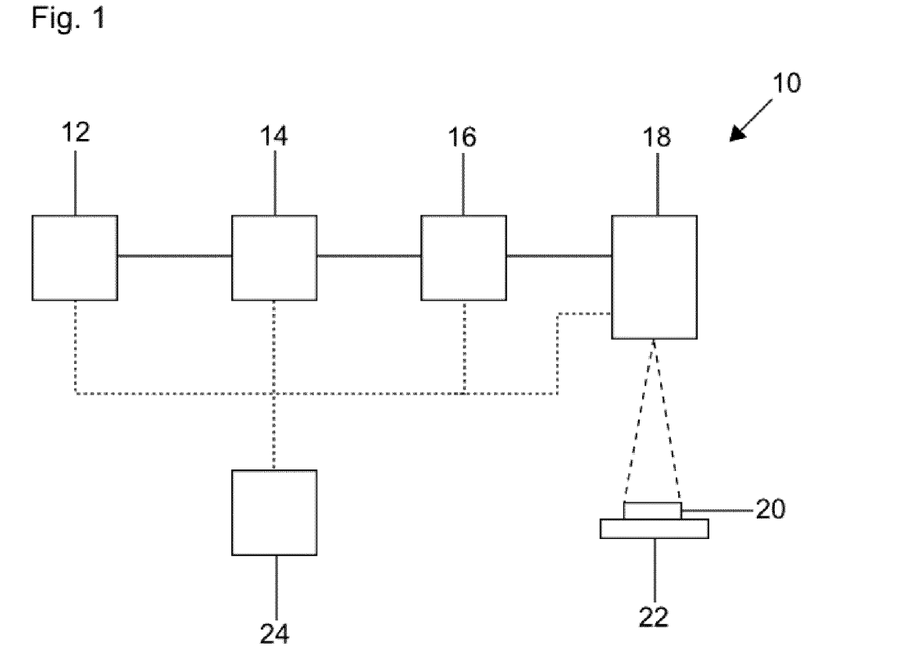
FIG. 1 is a schematic view of an apparatus for laser material processing according to the present invention.

In FIG. 1, a schematic view is shown of an apparatus 10 for laser material processing according to the present invention. The apparatus may comprise a laser source 12 or may be arranged inside the beam path of a laser beam from a laser source 12. The laser beam may, for example, be a continuous laser beam or a pulsed laser beam (e.g., an ultra-short-pulse laser beam). The apparatus 10 further comprises a parallel-offsetting unit 14, a beam deflecting unit 16 and a focusing device 18 which may, in the case of FIG. 1, for example be arranged in this order one after another.

The beam deflecting unit 16 optionally comprises two movable mirrors (with galvanometer drive) for deflecting the laser beam along two directions. The first reflecting mirror may effect a first laser beam deflection along a first direction, for example an x-direction, relative to a surface of the workpiece 20. Correspondingly, the first deflection may take place within a first angular range. The first deflection in the beam deflecting unit may hence at first be one-dimensional. If a second reflecting mirror is provided, said mirror is optionally arranged after the first reflecting mirror and on the beam path of the laser beam that has been deflected by the first reflecting mirror. Thereby the at first one-dimensionally deflected laser beam may be deflected by means of the second reflecting mirror along a second direction, e.g., a y-direction, relative to a surface of the workpiece 20, wherein the first and the second directions are optionally aligned orthogonally to one another. The second deflection may thus take place within a second angular range and hence allow for a two-dimensional deflection in the beam deflecting unit 16. Due to overlapping of the two deflections in x-direction and y-direction, consequently any desired path on the surface of the workpiece 20 may be realized.

The workpiece 20 to be processed may be arranged and/or held in a workpiece holder 22. The surface of the workpiece 20 may define an x-direction and/or a y-direction. The assistance of mirrors that can move quickly in the beam deflecting unit 16, for example mirrors with galvanometer drive, thus allows for a fast and precise positioning in x-direction and y-direction. In a desired relative movement of the workpiece 20 to the laser, the workpiece holder 22 may be configured to be displaceable by means of an actuating means.

The apparatus 10 for laser material processing may comprise a controller 24 configured to control and/or regulate the parallel-offsetting unit 14, the beam deflecting unit 16, and/or the focusing device 18. In case of regulation, sensors (not shown) for detecting parameters and/or status information are provided that may, for example, detect the position of the laser beam. This allows for an improved adjustment of the laser beam for process optimization or calibration.

Figure 2:
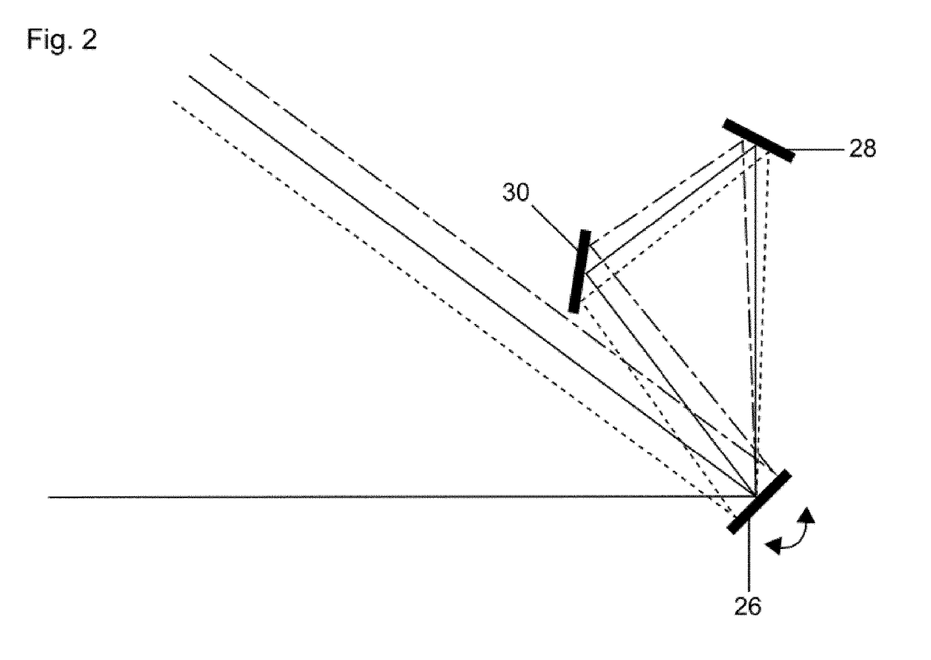
FIG. 2 is a schematic view of a parallel-offsetting unit according to the present invention.

In FIG. 2, a schematic view of the parallel-offsetting unit 14 according to the present invention is shown. The parallel-offsetting unit comprises a rotatable, reflecting mirror (e.g., with galvanometer drive) 26 and two stationary, reflecting mirrors 28 and 30. Hereby, it may be the case that a laser beam to be set off in this case approaching from the bottom left first impacts on the rotatable, reflecting mirror 26, is deflected towards a first stationary mirror 28 and subsequently to a second stationary mirror 30 before being eventually reflected again at the rotatable, reflecting mirror 26.

As is apparent from the dashed line in FIG. 2, the laser beams circulating in the mirror assembly diverge relative to an optical axis until they are again reflected at the rotatable, reflecting mirror. The achievable parallel offset (e.g., parallel translation) per rotational angle of the rotatable mirror is adjustable as a function of the distance between the mirrors.

As can be seen in FIG. 2, the parallel-offsetting unit 14 may be configured such that the laser beam is being reflected four times by means of the mirror assembly. The entry and exit reflections, i.e. the first and the second reflections in the parallel-offsetting unit 14 may take place at the rotatable, reflecting mirror 26. The mirror thereby compensates the angular differences of the circulating laser beams and allows for the beam exiting the parallel-offsetting unit 14 to be set off in parallel as a function of the rotational angle of the rotatable mirror 26. The parallel-offsetting unit may also be configured with another even number of stationary mirrors.

In the exemplary embodiment shown in FIG. 2, the mirrors 26, 28, and 30 of the parallel-offsetting unit 14 are substantially arranged in a triangular shape.

Optionally, the mirrors 26, 28, 30 are configured such that the laser beam entering the parallel-offsetting unit 14, the laser beams circulating in the parallel-offsetting unit 14 and/or the laser beam exiting the parallel-offsetting unit 14 are substantially coplanar and/or lie in one plane. The mirrors 26, 28, 30 of the parallel-offsetting unit 14 may be configured such that the perpendiculars on the mirror surfaces of the mirrors of the parallel-offsetting unit (in other words, the surface perpendiculars of the mirrors) lie in one plane.

The reflecting mirrors of the parallel-offsetting unit 14 and the mirror(s) of the beam deflecting unit 16 are optionally formed as plane mirrors, i.e. substantially without any surface curvature. Further, the mirrors may comprise one or more coatings for certain laser wavelengths and/or laser powers. The rotatable mirror 26 of the parallel-offsetting unit 14 and/or the mirror(s) for deflecting in the beam deflecting unit 16 are further optionally configured for a low inertia torque. In the beam deflecting unit 16, this allows for a quick positioning of the mirror(s) for deflecting laser beams, and in the parallel-offsetting unit 14 it allows for a fast parallel offset (or parallel translation) of laser beams for adjusting the angle of incidence of the laser beam axis.

In order to allow for a parallel offset of the laser beam in two spatial directions, optionally two parallel-offsetting units are arranged behind one another and optically coupled to each other such that the laser beam can be offset (e.g., translated) in parallel along two parallel-offset directions (or parallel translation directions) that are optionally orthogonal to each other. The further (second) parallel-offsetting unit may in turn comprise at least three reflecting mirrors, wherein one reflecting mirror of the at least three reflecting mirrors for setting of the laser beam in parallel, may be rotatable in the second parallel-offsetting unit. Hereby, the laser beam passing through the two parallel-offsetting units may be set off in parallel along two spatial directions. This allows for the angle of incidence of the laser beam axis to be inclined in two directions, e.g., in x-direction and in y-direction, relative to the surface of the workpiece. Hereby, for example, conical bores or cuts with defined edge angles.

Optionally the arrangement of the mirrors of the two parallel-offsetting units is selected such that the laser beam entering the first parallel-offsetting unit 14, the beams circulating in the first parallel-offsetting unit 14, and/or the laser beam exiting the first parallel-offsetting unit 14 are substantially coplanar, and the laser beam entering the second parallel-offsetting unit 14, the beams circulating in the second parallel-offsetting unit 14, and/or the laser beam exiting the second parallel-offsetting unit 14 are substantially coplanar. The mirrors 26, 28, and 30 of the first and second parallel-offsetting units 14 may be arranged such that the perpendiculars on the mirror surfaces respectively lie within one plane.

Figure 3:
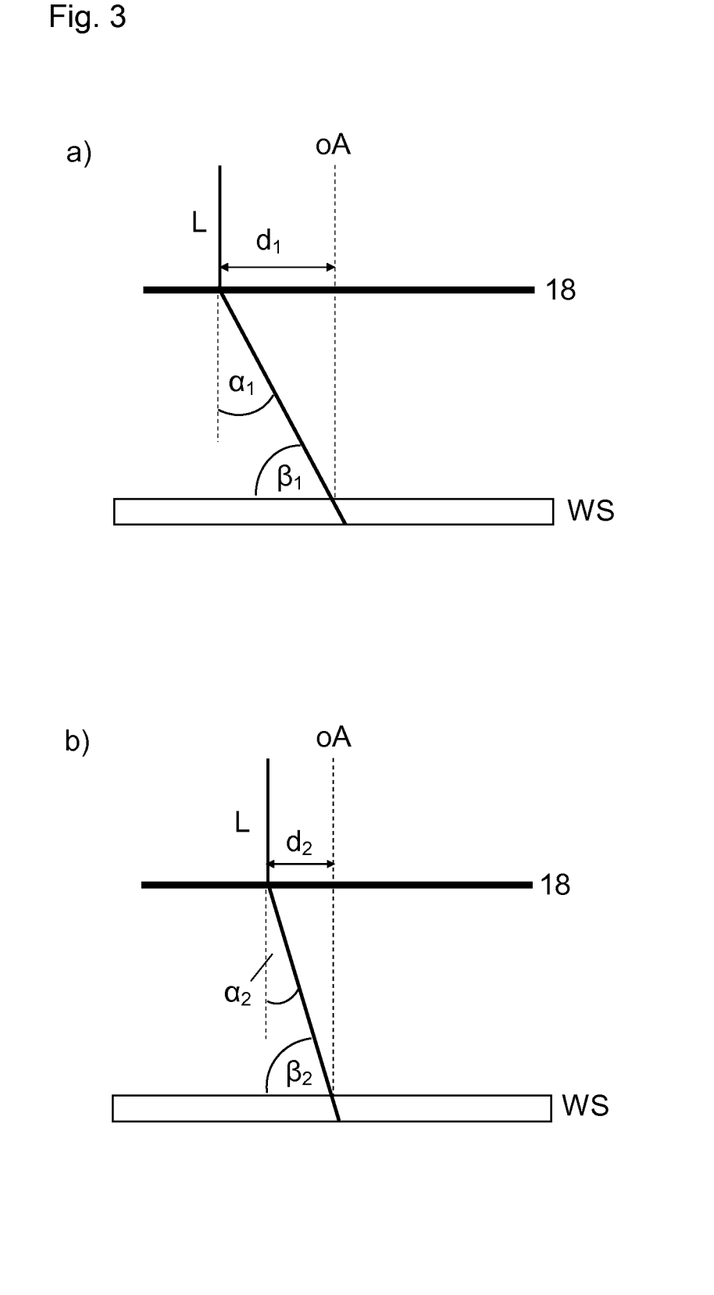
FIG. 3 is a schematic view explaining the parallel offset.

FIG. 3 is a schematic view explaining how adjusting the parallel offset (or the parallel translation) varies the angle of incidence of the laser beam axis on the workpiece. The laser beam L illustrates the laser beam that is offset (e.g., translated) parallel to the optical axis oA by means of the parallel-offsetting unit 14. This laser beam L, offset in parallel, may—as shown in FIG. 3—impact on the focusing device (e.g., a lense) 18. In the case of the arrangement shown as an example in FIG. 1, the beam deflecting unit 16 for guiding the path of the laser beam is arranged on the surface of the workpiece between the parallel-offsetting unit 14 and the focusing device 18, namely immediately after the parallel-offsetting unit 14 and immediately before the focusing device 18.

The distance d of the radial point of incidence of the laser beam L on the focusing device 18 to the optical axis oA may be adjusted by the offset (e.g. translation) of the laser beam L in parallel to the optical axis oA with the help of the parallel-offsetting unit 14. The angle of inclination a under which the laser beam exits from the focusing device 18, varies—as illustrated in FIG. 3—with the distance d of the radial point of incidence of the laser beam L to the optical axis oA. If the position of the workpiece WS is not altered, the angle of incidence β of the laser beam axis on the workpiece WS changes together with the angle of inclination α under which the laser beam axis exits from the focusing device 18. If the laser beam L impacts onto the focusing device 18 in parallel to the optical axis oA—as is shown herein as an example for explanatory purposes—i.e., without any deflection from the beam deflecting unit 16, the laser focus that is positioned on the surface of the workpiece for processing lies on the optical axis oA. If the laser beam L is inclined relative to the optical axis oA upon impacting onto the focusing device 18, then the laser focus that is positioned on the surface of the workpiece for processing does not lie on the optical axis oA.

Figure 4:
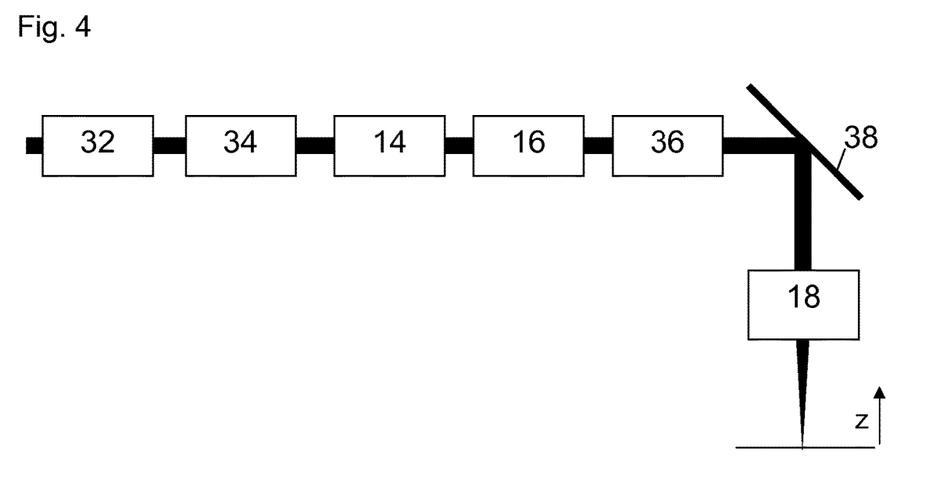
FIG. 4 is a schematic view of an apparatus for laser material processing according to the present invention according to a further exemplary embodiment.

FIG. 4 shows a schematic view of an apparatus 10 for laser material processing according to the present invention according to a further embodiment. The apparatus for laser material processing may comprise a beam shaping device (e.g., a beam expanding device) 32, a polarizing device 34, a device for focus position shift 36, and a beam splitter 38.

The beam shaping device 32 for changing the laser beam diameter may, in the direction of propagation of the laser beam, be arranged before, optionally immediately before, the parallel-offsetting unit 14. The beam shaping device (e.g., the beam expanding device or the beam reduction device) 32 may, for example, be realized through a telescope. The arrangement of the beam shaping device 32 may be selected such that it is positioned between the laser source 12 and the polarizing device 34, optionally immediately after the laser source 12 or optionally immediately before the polarizing device 34. If a beam shaping 32 device is provided in the form of a beam expanding device, it may produce a larger laser beam diameter which allows for a smaller laser focus diameter via the focusing device 18 (e.g., a single lens or a lens system).

The polarizing device 34 may, in the direction of propagation of the laser beam, be arranged before, optionally immediately before, the parallel-offsetting unit 14 and after, optionally immediately after, the beam shaping device 32. The polarizing device 34 includes a module which allows for selection of a desired polarization type, e.g., linear polarization or circular polarization or elliptical polarization. Optionally, the polarizing device may include a moving means which enables a dynamic adjustment of the polarization that is adapted to the movement of the beam.

As can be seen in FIG. 4, the apparatus 10 for laser material processing may further comprise a device for focus position shift 36 by means of which the focus position along the optical axis, i.e., along the indicated z-direction, may be translated. The device for focus position shift 36 may, in the direction of propagation of the laser beam, be arranged before the focusing device 18 and optionally immediately before or immediately after the beam deflecting unit 16. The device for focus position shift 36 may comprise an optical element or an optical module that is translatable along the propagation direction of the laser beam relative to a (for example, stationary) optic. In general, the focusing device 18 may be configured so as to be drivable by an actuating means in order to allow for a stepless adjustment of the working distance. Due to the device for focus position shift 36, the focus position at the workpiece 20 may be varied and processing of the workpiece 20 along a z-direction (i.e., along an optical axis) may be realized.

In the case of FIG. 4, a beam splitter 38 is provided optionally which is configured such that the laser beam and/or an electromagnetic radiation (e.g., light) detected by the focusing device 18 can be decoupled from the beam path of the laser, for example to monitor the beam or the process. The beam splitter 38 is, for example, arranged in the propagation direction of the laser beam after the beam deflecting unit 16 and before, optionally immediately before, the focusing device 18.

With the illustrated beam splitter 38, it can be achieved that the laser beam decoupled at this position and/or the decoupled electromagnetic radiation (e.g., light) that is detected via the focusing device 18 are directed to an optionally provided monitoring device (not shown).

The monitoring device may further comprise a camera sensor which is, for example, optically coupled with the beam splitter 38 via a camera lens. The laser beam and/or the electromagnetic radiation (e.g., light) of the workpiece surface detected via the focusing device 18, may then be guided to the beam splitter 38, be decoupled from the pathway of the laser at the beam splitter 38 and eventually be directed to the camera sensor for process monitoring. The controller 24 may be formed and configured to control the parallel-offsetting unit 14, the beam deflecting unit 16, the focusing device 18, as well as possibly further components such as laser source 12, device for focus position shift 36, beam shaping device 32, and polarizing device 34.

The focusing device 18 for focusing the laser beam may be configured as a single lens, a lens system or a mirror system. Preferably, the focusing device is configured stationary and the varying of the focus position is then realized by the device for focus position shift 36.

Alternatively or additionally, the device for focus position shift 36 may be connected between the parallel-offsetting unit 14 and the beam deflecting device 16, optionally immediately after the parallel-offsetting unit 14 or optionally immediately before the beam deflecting unit 16. The other components may further be configured as described above.

It is to be noted that the focusing device 18 may generally also be arranged before, optionally immediately before, the beam deflecting device 16. Further, the focusing device 18 may also be combined with the device for focus position shift 36 and be integrally formed.

In general, the above-mentioned beam splitter 38 may also be arranged at another position in the beam path of the laser. For example, the arrangement of the beam splitter 38 may be selected such that the laser beam can be decoupled, when seen in the propagation direction, before, optionally immediately before, the focusing device 18.

In the sense of a flexible adjustment of the apparatus 10 for laser material processing, the parallel-offsetting unit 14, the beam deflecting unit 16, the focusing device 18, as well as possibly further components such as laser source 12, beam shaping device 32, polarizing device 34, device for focus position shift 36, and beam splitter 38 may be designed modular and may be configured to be interchangeable.

It is further optionally provided that the apparatus 10 for laser material processing comprises a gas nozzle which is configured to create a directed gas beam onto the surface of the workpiece. This allows for an improvement in processing quality. The gas used may be an unreactive or inert gas such as, for example, nitrogen. The configuration of the gas nozzle may be adapted to the process of laser processing.

In order to improve precision in laser material processing, further a beam rotator is optionally provided. The beam rotator being configured to create an intensity profile of the laser beam that rotates around a rotation axis. In this case, the beam rotator may comprise one or more rotating optical consecutive elements in the propagation direction of the laser beam. The beam rotator may be realized especially by means of a prism or mirror assembly, for example of a reversing prism (Dove prism). The rotation of the intensity distribution of the laser beam particularly improves the circularity of the bore holes.

The controller 24 may further be configured such that a synchronized controlling of the beam deflecting unit 16, the parallel-offsetting unit 14, the focusing device 18, the device for focus position shift 36, and/or the laser source 12 is implemented. The control of the components may in particular be conducted digitally, wherein optionally separate control cards are provided for the individual components (e.g., the beam deflecting unit, parallel-offsetting unit etc.). The control cards may be controlled via a central controlling device, for example, a suitable software on a computer or by a controller that is independent from a computer. The control cards ensure a synchronic and fail-safe control of the components.

It may eventually be noted that the apparatus for laser material processing may optionally be an apparatus for laser material processing for performing drilling, optional microdrilling, wherein the bore hole diameters may be in the micrometer range, optionally below 500 μm or optionally below 200 μm.

In general, the present invention may also refer to an apparatus for laser material processing (or laser material processing apparatus) in combination with a material to be processed, optionally with a plate material to be laser processed.

All the above-described exemplary embodiments and variants are applicable to the apparatus 10 for laser material processing in their entirety respectively individually or in combination.

The invention claimed is:

1. An apparatus for laser material processing comprising:
   a beam deflecting unit with at least one reflecting mirror for deflecting a laser beam (L) that defines a laser beam axis, along a first direction relative to a workpiece to be processed for path guiding the laser beam (L) on a workpiece surface;
   a parallel-offsetting unit with three reflecting mirrors for parallel offsetting the laser beam relative to an optical axis (oA) along a first parallel-offset direction, wherein one reflecting mirror of the three reflecting mirrors for parallel offsetting the laser beam is rotatable and entry reflection and exit reflection takes place at the rotatable, reflecting mirror, wherein two of the three reflecting mirrors are stationary mirrors, and wherein the parallel-offsetting unit is configured such that the laser beam is reflected four times by the mirror assembly;
   a focusing device for focusing the laser beam which has been translated in parallel by the parallel-offsetting unit and deflected by the beam deflecting unit onto the workpiece,
   wherein the angle of incidence of the laser beam axis on the workpiece can be varied by adjusting the parallel-offset performed by the parallel-offsetting unit; and
   a controller configured to control a parallel translation of the parallel-offsetting unit by controlling tilting of the one rotating mirror.

2. The apparatus according to claim 1, wherein the beam deflecting unit includes two reflecting mirrors arranged such that the laser beam can be deflected along the first direction and a second direction.

3. The apparatus according to claim 1, wherein the mirrors of the parallel-offsetting unit are configured such that the perpendiculars on the mirror surfaces of the mirrors of the parallel-offsetting unit lie in one plane.

4. The apparatus according to claim 1, further comprising:
   a further parallel-offsetting unit provided for parallel translation of the laser beam along a second parallel-offset direction, wherein the parallel-offsetting units are optically coupled to each other such that the laser beam may be offset in parallel along two different parallel-offset directions.

5. The apparatus according to claim 1, further comprising:
   a device for focus position shift of the laser beam arranged in the propagation direction of the laser beam before the focusing device.

6. The apparatus according to claim 1, further comprising:
   a controller configured to implement synchronized control of the beam deflecting unit, the parallel-offsetting unit, the focusing device, a device for focus position shift, and/or a laser source.

7. The apparatus according to claim 1, further comprising:
   a beam splitter provided in the propagation direction of the laser beam before the focusing device and being configured to decouple the laser beam and/or electromagnetic radiation detected via the focusing device from the beam path of the laser.

8. The apparatus according to claim 7, further comprising:
   a monitoring device optically coupled to the beam splitter and configured to detect the decoupled laser beam and/or the decoupled electromagnetic radiation.

9. The apparatus according to claim 1, wherein a beam shaping device for changing the laser beam diameter is provided and arranged in the propagation direction of the laser beam before the parallel-offsetting unit.

10. The apparatus according to claim 1, wherein a polarizing device is provided and is arranged in the propagation direction of the laser beam before the parallel-offsetting unit.

11. The apparatus according to claim 1, wherein the beam deflecting unit is arranged between the parallel-offsetting unit and the focusing device.

12. The apparatus according to claim 1, further comprising:
   a workpiece holder in which the workpiece is arranged and/or being held.

13. A system comprising: the apparatus according to claim 1; and
   the workpiece to be processed.

14. The system according to claim 13, wherein the beam deflecting unit includes two reflecting mirrors arranged such that the laser beam can be deflected along the first direction and a second direction which are orthogonal to one another.

15. The system according to claim 13, further comprising: a further parallel-offsetting unit provided for parallel translation of the laser beam along a second parallel-offset direction, wherein the parallel-offsetting units are optically coupled to each other such that the laser beam may be offset in parallel along two different parallel-offset directions which are orthogonal to each other.

16. The system according to claim 13, further comprising: a device for focus position shift of the laser beam arranged in the propagation direction of the laser beam before the focusing device and after the beam deflecting unit (16).

17. The system according to claim 13, further comprising: a beam splitter provided in the propagation direction of the laser beam immediately before the focusing device and being configured to decouple the laser beam and/or electromagnetic radiation detected via the focusing device from the beam path of the laser.

18. The apparatus according to claim 2, wherein a polarizing device is provided and is arranged in the propagation direction of the laser beam before the parallel-offsetting unit.

19. The apparatus according to claim 9, wherein a polarizing device is provided and is arranged in the propagation direction of the laser beam before the parallel-offsetting unit and after the beam shaping device.

20. The apparatus according to claim 1, wherein the beam deflecting unit is arranged between the parallel-offsetting unit and the focusing device, and the beam deflecting unit is immediately after the parallel-offsetting unit.

21. The apparatus according to claim 1, wherein the beam deflecting unit is arranged between the parallel-offsetting unit and the focusing device, and the beam deflecting unit is immediately before the focusing device.

22. The apparatus according to claim 3, wherein the one reflecting mirror is rotatable with a plane of rotation that is the one plane that the perpendiculars on the mirror surfaces of the mirrors of the parallel-offsetting unit lie in.

23. The apparatus according to claim 1, wherein all of a reflecting surface of the one reflecting mirror lies in a single plane.

24. The apparatus according to claim 4, wherein the angle of incidence of the laser beam axis on the workpiece is varied by selectively adjusting the parallel-offset performed by the parallel-offsetting units.

* * * * *